United States Patent [19]
Mabuchi et al.

[11] 3,896,051
[45] July 22, 1975

[54] METHOD OF REACTIVATION OF RANEY NICKEL

[75] Inventors: Shunsuke Mabuchi; Kenji Tsuzuki; Hideaki Matsunaga; Sadami Shimizu; Makoto Sumita, all of Shin-Nanyo, Japan

[73] Assignee: Toyo Soda Manufacturing Co., Ltd., Japan

[22] Filed: Dec. 26, 1973

[21] Appl. No.: 427,683

[30] Foreign Application Priority Data
Dec. 25, 1972  Japan .............................. 47-129219

[52] U.S. Cl. ............ 252/412; 252/414; 252/477 Q; 260/635 R
[51] Int. Cl. ............................................ B01j 11/30
[58] Field of Search ................ 252/412, 414, 477 Q; 260/635 R

[56] References Cited
UNITED STATES PATENTS
2,604,455  7/1952  Reynolds et al. ................... 252/412
2,879,306  3/1959  Hutchinson ..................... 260/635 R
2,950,260  8/1960  Rosenbaum ........................ 252/412
3,544,485  12/1970  Taira et al. ...................... 252/477 Q FOREIGN PATENTS OR APPLICATIONS
833,592  4/1960  United Kingdom ................ 252/412
44-9459  1/1969  Japan .............................. 252/477 Q

*Primary Examiner*—Winston A. Douglas
*Assistant Examiner*—P. E. Konopko
*Attorney, Agent, or Firm*—Oblon, Fisher, Spivak, McClelland & Maier

[57] ABSTRACT

A poisoned Raney nickel catalyst from the hydrogenolysis of an organic peroxide polymer is reactivated by treating the catalyst with a 0.1–5 N solution of an activating reagent selected from the group consisting of ammonia, and an alkali metal or an alkaline earth metal hydroxide, carbonate or carboxylate having 1–4 carbon atoms at 20°–200°C under an inert gas atmosphere.

10 Claims, No Drawings

METHOD OF REACTIVATION OF RANEY NICKEL

BACKGROUND OF THE INVENTION

1. Field of the Invention:

The present invention relates to a method for reactivating poisoned Raney nickel which has been used for the hydrogenolysis of organic peroxide polymers.

2. Description of the Prior Art:

Methods are known for the reactivation of poisoned Raney nickel catalysts. However, no techniques are known for the reactivation of poisoned Raney nickel catalysts which have been used for the hydrogenolysis of organic peroxide polymers. When Raney nickel catalysts are used for the hydrogenolysis of organic peroxide polymers, the catalysts are inactivated by certain catalyst poisons.

A need, therefore, exists for a technique for reactivating Raney nickel catalysts which have been specifically deactivated in the hydrogenolysis reaction of organic peroxide polymers.

SUMMARY OF THE INVENTION

Accordingly, one object of the present invention is to provide a method for reactivating poisoned Raney nickel catalysts.

Briefly, this object and other objects of the invention as hereinafter will become more readily apparent can be attained by providing a method for the reactivation of a poisoned Raney nickel catalyst used for the hydrogenolysis of an organic peroxide polymer by treating the catalyst with a 0.1 – 5 N solution of an activating reagent selected from the group consisting of ammonia, an alkali metal or an alkaline earth metal hydroxide, carbonate or carboxylate having 1–4 carbon atoms at 20°–200°C under an inert gas atmosphere.

DETAILED DESCRIPTION OF THE PREFERRED EMBODIMENTS:

The poisoned Raney nickel catalysts to which the process of the present invention is applicable include Raney nickel catalyst which are modified by small amounts of copper, chromium, iron, or the like which are used in the hydrogenolysis of organic peroxide polymers. The organic peroxide polymers which are subjected to hydrogenolysis include peroxide polymers of olefins which include conjugated diolefins such as butadiene, isoprene, 2-ethyl-1, 3-butadiene, 2,3-dimethyl-1,3-butadiene, 2,5-dimethyl-2,4-hexadiene, alkyl substituted conjugated diolefins thereof; cyclo substituted conjugated diolefins such as cyclopentadiene, cyclohexadiene, dimethylfuran, furan; alkyl substituted cycle conjugated diolefins, and indene and styrene.

It has been found that organic peroxide polymers can be subjected to hydrogenolysis in the presence of a Raney nickel catalyst. However the organic peroxide polymers easily poison the Raney nickel catalysts because of certain inherent chemical properties. If prior to hydrogenolysis the Raney nickel catalyst is contacted with the organic peroxide polymer, the degree of poisoning is substantial which results in low yields of the diol product and the reaction rate is low.

The degree of catalyst poisoning however, can be significantly reduced by improving the contact between the organic peroxide polymer and the catalyst in the hydrogenation reaction. In order to improve the contact between the catalyst and the polymer, the catalyst is suspended in a medium and then exposed to a hydrogen atmosphere whereby the hydrogen is absorbed. At the same time the organic peroxide polymer is added to the medium which of course dilutes it, through a high pressure, small amount constant volume pump, at a rate the same or less than the rate of hydrogenolysis of the polymer. In the hydrogenolysis reaction, however, poisoning materials such as organic acids, polymers and the like continue to be absorbed on the surface of the catalyst which in turn decreases the amount of active surface area of the catalyst and results in a rapid decrease in activity even though the contact method improves the reaction. Thus, the amount of the organic peroxide polymer which can be hydrogenated per unit amount of the Raney nickel catalyst is limited and of course, it is consumed as the reaction proceeds.

An investigation into the problem of the deactivation of the catalyst has revealed that Raney nickel catalysts poisoned by organic peroxide polymers can be reactivated by treating the inactivated catalyst with a solution of an activating reagent such as ammonia, an alkali metal or an alkaline earth metal hydroxide carbonate or carboxylate having 1–4 carbon atoms under an inert gas atmosphere after each hydrogenolyis reaction. This method of reactivation of a poisoned Raney nickel catalyst which is presently used in the hydrogenolysis of organic peroxide polymers has heretofore been unknown. When the procedure is repeatedly used to remove the poison from the catalyst, the catalyst can be reused from 50 to 100 times.

In the reactivation of Raney nickel, the temperature at which the catalyst is treated, the concentration of the activating reagent and the treatment time all influence the degree of activation. The treatment temperature usually ranges from 20° to 200°C, preferably 50° to 120°C, especially 70° to 120°C. If the treatment temperature is greater than 200°C the aluminum component of the Raney nickel catalyst is dissolved and consequently the nickel atoms are rearranged. Also, the crystalline particles are increased and the catalytic activity is decreased. From the viewpoint of catalyst life, it is preferably that the temperature be lower. However, at temperatures less than 20°C, the separation of the absorbed poison from the Raney nickel catalyst is too slow and the treatment time is too long. Suitable media for the activating reagents include water, and lower alcohols such as methanol, ethanol and isopropanol. Satisfactory treatment results are also achieved when the concentration of the activating reagent ranges from 0.1 to 5 N.

The treatment time depends upon the concentration of the activating reagent, the treatment temperatures and the ratio of the organic peroxide polymer to the Raney nickel catalyst in the hydrogenolysis reaction and is usually 2 to 8 hours. The treatment conditions for the Raney nickel catalyst depend upon the ratio of the organic peroxide polymer to the Raney nickel, which must be severe at increased ratios. From the viewpoint of catalyst life, severe treatment times are preferably used rather than using increased treatment temperatures. Suitable inert gases which can be used in the treatment of the poisoned Raney nickel catalyst include hydrogen, nitrogen and the like. These gases do not adversely effect the activity of the catalyst, and preferably hydrogen is used.

Having generally described this invention, a further understanding can be obtained by reference to certain specific examples which are provided herein for purposes of illustration only and are not intended to be limiting unless otherwise specified.

EXAMPLE 1

Into a 200 cc autoclave equipped with an electromagnetic stirrer, 10 g of Raney nickel (manufactured by Kawaken Fine Chemical K.K.) and 50 g of tetrahydrofuran were charged. Further, a 60 g solution of 20 g isoprene peroxide polymer in tetrahydrofuran was charged to the autoclave at 60°C under a hydrogen pressure of 50 kg/cm$^2$ over 2 hours by a small, constant amount injection pump. After the hydrogenolysis was completed the catalyst was separated, and the reaction mixture was analyzed by gas chromatography. The reaction mixture contained 1.6 g of 2-methyl-1,2-butanediol, 1.5 g of 2-methyl-3,4butanediol and 6.4 g of 2-methyl-1,4-butanediol.

The total yield of the diols based on the isoprene peroxide polymer was 45.7%. The poisoned Raney nickel catalyst and 100 cc of an aqueous 0.5 N-NaOH solution were charged into the 200 cc autoclave equipped with an electromagnetic stirrer, and the mixture was heated and stirred at 90°C for 3 hours under a hydrogen atmosphere to activate the catalyst. The catalyst was separated, and thereafter was used for the hydrogenolysis of the isoprene peroxide polymer. The operation was repeated 30 times with the same catalyst, and no decrease in activity of the catalyst was not found.

EXAMPLES 2 – 10

In the autoclave of Example 1, each of the peroxide polymers shown in Table 1 were hydrogenated under the reaction conditions shown in Table 1. After each hydrogenolysis reaction, the poisoned Raney nickel catalyst was treated under the conditions shown in Table 1. This cycle was repeated a number of times as shown in each Example in the table. The results are shown in Table 1.

TABLE I

| Example | Peroxide Polymer (g) | Polymer (mole) | Raney nickel (g) | Reaction temperature (°C) | Reaction pressure (Kg/cm$^2$) | Repeated use of catalyst (time) | Alkali | Temperature (°C) | Diol (g) | | | Total yield of diol (%) |
|---|---|---|---|---|---|---|---|---|---|---|---|---|
| 2 | isoprene peroxide polymer 20 | 0.20 | 10 | 60 | 50 | 1 | 1,2-butanediol | | 2-methyl-3,4-butanediol 1.7 | 2-methyl-1,4-butanediol 1.5 | 2-methyl-1,4-butanediol 45.7 6.3 | |
| | 20 | 0.20 | 10 | 60 | 50 | 40 | 0.5N-Na$_2$CO$_3$ 100 cc | 90 | 1.4 | 1.3 | 6.0 | 41.9 |
| 3 | 2,5-dimethyl-2,4-hexadiene peroxide polymer 20 | 0.14 | 10 | 50 | 70 | 1606362 | 3N-ammonia | | 2,5-dimethyl-2,5-hexanediol 17.1 | | | 83.2 |
| | 20 | 0.5 | 10 | 50 | 70 | 22 | 100 cc | 100 | 2,5-dimethyl-2,5-hexanediol 16.7 | | | 81.2 |
| 4* | 2,5-dimethyl-2,4-hexadiene peroxide polymer 20 | 0.14 | 10 | 50 | 50 | 1 | 0.1N-KOH aq sol. | | 2,5-dimethyl-2,5-hexanediol 17.0 | | | 82.7 |
| | 20 | 0.14 | 10 | 50 | 50 | 35 | 100 cc | 90 | 2,5-dimethyl-2,5-hexanediol 16.5 | | | 80 |
| 5* | 2,5-dimethyl-2,4-hexadiene peroxide polymer 20 | 0.14 | 7 | 50 | 70 | 1 | 0.5N-NaOH aq. sol. | | 2,5-dimethyl-2,5-hexanediol 17.1 | | | 83.2 |
| | 20 | 0.14 | 7 | 50 | 70 | 45 | 100 cc | 90 | 2,5-dimethyl-2,5-hexanediol 16.8 | | | 81.8 |
| 6 | 2-ethyl-1,3-butadiene peroxide polymer 20 | 0.18 | 10 | 60 | 50 | 1 | 0.5N-Ba(OH)$_2$ aq. sol. | | 2-ethyl-1,2-butanediol 1.9 | 2-ethyl-3,4-butanediol 1.1 | 2-ethyl-1,4-butanediol 5.6 | 72.9 |
| | 20 | 0.18 | 10 | 60 | 50 | 25 | 100 cc | 100 | 1.7 | 1.0 | 5.5 | 69.5 |
| 7 | 2,3-dimethyl-1,3-butadiene peroxide polymer 20 | 0.18 | 10 | 60 | 80 | 1 | 0.2N-LiOH aq. sol | | | 2,3-dimethyl-1,2-butanediol 3.7 | 2,3-dimethyl-1,4-butanediol 6.5 | 86.4 |
| | 20 | 0.18 | 10 | 60 | 80 | 15 | 100 cc | 120 | | 3.6 | 6.4 | 84.7 |
| 8 | cyclopentadiene peroxide polymer 20 | 0.20 | 10 | 50 | 70 | 1 | 4N-NaOH aq. sol. 100 cc | | 1,4-cyclopentanediol 15.5 | | | 74.5 |
| | 20 | 0.20 | 10 | 50 | 70 | 40 | | 70 | 1,4-cyclopentanediol 15.1 | | | 72.5 |

TABLE 1—Continued

| Example | Peroxide (g) | Polymer (mole) | Raney nickel (g) | Reaction temperature (°C) | Reaction pressure (Kg/cm²) | Repeated use of catalyst (time) | Alkali | Temperature (°C) | Diol (g) | | Total yield of diol (%) |
|---|---|---|---|---|---|---|---|---|---|---|---|
| 9 | styrene peroxide polymer 20 | 0.14 | 10 | 40 | 20 | 1 | 0.5N-KOH ethanol sol. 100 cc | 90 | benzyl alcohol 1.3 | phenyl-glycol 16.3 | 88.6 |
|   | 20 | 0.14 | 10 | 40 | 20 | 10 | | | benzyl alcohol 1.2 | phenyl-glycol 15.7 | 85.0 |
| 10 | styrene peroxide polymer 20 | 0.14 | 10 | 40 | 20 | 1 | 1N-AcONa sol. 100 cc | 90 | benzyl alcohol 1.3 | phenyl-glycol 16.2 | 88.1 |
|   | 20 | 0.14 | 10 | 40 | 20 | 50 | | | benzyl alcohol 1.2 | phenyl-glycol 15.7 | 85.0 |

*In Example 4, a modified Raney nickel catalyst containing 1% chromium was used.
*In Example 5, the treatment time was 5 hours while in the other Examples, the treatment time was 3 hours.

EXAMPLE 11

Into a 200 cc autoclave equipped with an electromagnetic stirrer, 10 g of Raney nickel (manufactured by Kawaken Fine Chemical K.K.) and 50 g of ethyl acetate were charged. Further, a 60 g solution of 0.23 mole butadiene peroxide polymer (as $C_4H_6O_2$) in ethyl acetate was charge into the autoclave at 70°C under a hydrogen pressure of 50 kg/cm² over 2 hours by a small, constant amount injection pump. After the hydrogenolysis was completed, the catalyst was separated and the reaction mixture was analyzed by gas chromatography.

The reaction mixture contained 11.6 g of 1,4-butanediol, 3.82 g of 1,2-butanediol and 1.95 g of other diols.

The yield of 1,4-butanediol based on the butadiene peroxide polymer was 56%. The poisoned Raney nickel catalyst and 100 cc of an aqueous 0.5 N-NaOH solution were charged into the 200 cc autoclave equipped with an electromagnetic stirrer, and the mixture was heated and stirred at 90°C for 3 hours under a hydrogen atmosphere to activate the catalyst. The catalyst was separated and was used for the hydrogenolysis of isoprene peroxide polymer.

The operation was repeated 100 times using the same catalyst, and no decrease in activity of the catalyst was found.

EXAMPLES 12–19

In the autoclave of Example 11, butadiene peroxide polymers were hydrogenated under the reaction conditions shown in Table 2. After each hydrogenolysis reaction, the poisoned Raney nickel catalyst was reactivated under the conditions shown in Table 2. This cycle was repeated for the number of times shown in the table for each Example. The results are shown in Table 2.

TABLE 2

| Example | butadiene polymer (g) | peroxide (mole) | Raney nickel (g) | Reaction temperature (°C) | Reaction pressure (kg/cm²) | Repeated use of catalyst (time) | Alkali | Temperature (°C) | 1,4-butanediol (g) | 1,2-butanediol (g) | other (g) | Yield of 1,4-butanediol % |
|---|---|---|---|---|---|---|---|---|---|---|---|---|
| 12 | 20 | 0.23 | 10 | 90 | 10 | 1 | 0.3N-LiOH aq. sol. 100 cc | 130 | 11.59 | 3.80 | 1.95 | 56 |
|   | 20 | 0.23 | 10 | 90 | 10 | 45 | | | 11.39 | 3.75 | 1.97 | 55 |
| 13 | 20 | 0.23 | 10 | 50 | 300 | 1 | 4N-KOH aq. sol. 100 cc | 70 | 11.58 | 3.86 | 1.91 | 56 |
|   | 20 | 0.23 | 10 | 50 | 300 | 70 | | | 10.97 | 3.65 | 2.03 | 53 |
| 14 | 20 | 0.23 | 10 | 70 | 50 | 1 | 0.5N-KOH ethanol sol. 100 cc | 90 | 11.59 | 3.82 | 1.93 | 56 |
|   | 20 | 0.23 | 10 | 70 | 50 | 90 | | | 11.40 | 3.67 | 1.94 | 55 |
| 15* | 20 | 0.23 | 10* | 70 | 50 | 1 | 0.5N-Ba(OH)₂ aq. sol. 100 cc | 100 | 11.60 | 3.83 | 1.92 | 56 |
|   | 20 | 0.23 | 10* | 70 | 50 | 80 | | | 11.17 | 3.74 | 2.00 | 54 |
| 16* | 20 | 0.23 | 10 | 70 | 100 | 1 | 0.1N-NaOH aq. sol. 100 cc | 70 | 11.61 | 3.87 | 1.91 | 56 |
|   | 20 | 0.23 | 10 | 70 | 100 | 20 | | | 10.93 | 3.60 | 2.04 | 53 |
|   | 20 | 0.23 | 10 | 70 | 100 | 70 | 0.5N-NaOH aq. sol. 100 cc | 90 | 11.41 | 3.80 | 1.98 | 55 |
| 17 | 20 | 0.23 | 10 | 90 | 50 | 1 | 3N-ammonia 100 cc | 100 | 11.58 | 3.83 | 1.96 | 56 |
|   | 20 | 0.23 | 10 | 80 | 50 | 50 | | | 11.41 | 3.79 | 2.01 | 55 |
| 18 | 20 | 0.23 | 10 | 70 | 50 | 1 | 0.5N-CH₃COONa aq. sol. 100 cc | 90 | 11.60 | 3.82 | 1.97 | 56 |
|   | 20 | 0.23 | 10 | 70 | 50 | 60 | | | 11.40 | 3.77 | 2.00 | 55 |

TABLE 2 — Continued

| Example | Reaction Conditions | | | | | | Reactivation Conditions | | Product | | | Yield of 1,4-butane-diol % |
| --- | --- | --- | --- | --- | --- | --- | --- | --- | --- | --- | --- | --- |
| | butadiene polymer (g) | peroxide (mole) | Raney nickel (g) | Reaction temperature (°C) | Reaction pressure (kg/cm²) | Repeated use of catalyst (time) | Alkali | Temperature (°C) | 1,4-butanediol (g) | 1,2-butanediol (g) | other | |
| 19 | 20 | 0.23 | 10 | 70 | 50 | 1 | 0.5N-K₂CO₃ aq. sol. 100 cc | | 11.58 | 3.75 | 1.98 | 56 |
| | 20 | 0.23 | 10 | 70 | 50 | 60 | | 90 | 11.41 | 3.80 | 1.92 | 55 |

*In Example 15, a modified Raney nickel catalyst containing 1% chromium was used.
*In Example 16, the poisoned Raney nickel was treated at 70°C with 0.1N-NaOH each time after the reaction for 20 times, and thereafter was treated at 90°C with 0.5N-NaOH thereafter.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A method for the reactivation of a poisoned Raney nickel catalyst modified by a small amount of metal from the group consisting of copper, chromium and iron which is used for the hydrogenolysis of inorganic peroxide polymer to form a diol product which comprises treating said catalyst with a 0.1 – 5 N aqueous or lower alcohol solution of an activating reagent selected from the group consisting of ammonia, an alkaline earth metal hydroxide, carbonate or carboxylate having 1 – 4 carbon atoms and an alkali metal carbonate or carboxylate having from 1 – 4 carbon atoms at 20°–200°C under an atmosphere of hydrogen or nitrogen from 2 to 8 hours, and separating said treated catalyst from said aqueous or lower alcohol solution.

2. The method of claim 1, wherein said organic peroxide polymer is a conjugated diolefin peroxide polymer, a cyclo substituted conjugated diolefin peroxide polymer, an alkyl substituted cyclo conjugated diolefin peroxide polymer, an indene peroxide polymer or a styrene peroxide polymer.

3. The method of claim 1, wherein said organic peroxide polymer is butadiene peroxide polymer.

4. The method of claim 1, wherein the organic peroxide polymer is an olefin peroxide polymer of an olefin selected from the group consisting of isoprene, 2,5-dimethyl-2,4-hexadiene, 2-ethyl-1,3-butadiene, 2,3-dimethyl-2,3-butadiene cyclopentadiene and styrene.

5. The method of claim 1, wherein said solution of the activating reagent is prepared from water.

6. The method of claim 1, wherein said activating reagent is an alkali metal carbonate.

7. The method of claim 1, wherein said activating reagent is an alkali metal carboxylate having from 1 to 4 carbon atoms.

8. The method of claim 1, wherein said activating reagent is an alkaline earth metal hydroxide.

9. The method of claim 1, wherein said activating reagent is an alkaline earth metal carbonate.

10. The method of claim 1, wherein said activating reagent is an alkaline earth metal carboxylate having from 1 to 4 carbon atoms.

* * * * *

UNITED STATES PATENT OFFICE
CERTIFICATE OF CORRECTION

PATENT NO. : 3,896,051
DATED : July 22, 1975
INVENTOR(S) : Shunsuke Mabuchi et al It is certified that error appears in the above–identified patent and that said Letters Patent are hereby corrected as shown below:

Column 7, line 26 (Claim 1, line 4) change "inorganic" to

-- an organic --

Signed and Sealed this

Twenty-fourth Day of August 1976

[SEAL]

Attest:

RUTH C. MASON
*Attesting Officer*

C. MARSHALL DANN
*Commissioner of Patents and Trademarks*